(12) United States Patent
Irwin et al.

(10) Patent No.: US 6,522,934 B1
(45) Date of Patent: Feb. 18, 2003

(54) DYNAMIC UNIT SELECTION IN A PROCESS CONTROL SYSTEM

(75) Inventors: William G. Irwin, Austin, TX (US); David L. Deitz, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/347,178

(22) Filed: Jul. 2, 1999

(51) Int. Cl.[7] .............................................. G05B 11/01
(52) U.S. Cl. ................................ 700/11; 700/2; 700/5; 700/19; 700/20; 700/219; 712/23; 712/218; 712/217; 712/242; 709/108; 709/203; 709/212; 709/330; 717/125; 717/133
(58) Field of Search ............................ 700/2–5, 19–20, 700/219; 712/23, 218, 217, 242; 709/108, 203, 330, 212; 710/22; 717/125, 133

(56) References Cited

U.S. PATENT DOCUMENTS

| | | | | |
|---|---|---|---|---|
| 4,884,217 A | * | 11/1989 | Skeirik et al. | 700/167 |
| 5,058,043 A | * | 10/1991 | Skeirik | 700/167 |
| 5,812,133 A | * | 9/1998 | Schultz | 345/809 |
| 5,844,795 A | * | 12/1998 | Johnston et al. | 700/83 |
| 5,963,448 A | * | 10/1999 | Flood et al. | 700/82 |
| 6,061,809 A | * | 5/2000 | Glaser et al. | 714/10 |
| 6,078,320 A | * | 6/2000 | Dove et al. | 345/866 |
| 6,195,591 B1 | * | 2/2001 | Nixon et al. | 700/83 |
| 6,269,274 B1 | * | 7/2001 | Steinman et al. | 700/28 |
| 6,298,454 B1 | * | 10/2001 | Schleiss et al. | 714/37 |

FOREIGN PATENT DOCUMENTS

| | | |
|---|---|---|
| JP | 03-063822 | 3/1991 |
| JP | 04-355867 | 12/1992 |
| JP | 05-094931 | 4/1993 |
| JP | 06-168007 | 6/1994 |
| WO | WO 98/13737 A | 2/1998 |

OTHER PUBLICATIONS

Copy of Search Report Issued by Bristish Patent Office regarding search dated Oct. 26, 2000, in GB 0015461.7.

Dispatch #349839 (including English translation) issued in Japanese Application No. 2000–196173 dated Oct. 22, 2002.

* cited by examiner

Primary Examiner—Ramesh Patel
(74) Attorney, Agent, or Firm—Marshall, Gerstein & Borun (57) ABSTRACT

A process control system includes a controller that executes a control routine which performs a series of unit procedures within a process. The control routine is written or created to specify the class of unit to be used for each unit procedure, but not the actual unit itself. At the start of each unit procedure of the control routine, a dynamic unit selection routine selects a particular unit as the unit to be used during operation of that unit procedure. When called, the dynamic unit selection routine determines a set of possible units to be used, determines if each of the set of possible units is suitable for use during that unit procedure of the control routine based on a suitability criterion, prioritizes the units that meet the suitability criterion based on a priority criterion and selects the particular unit from the prioritized list of suitable units in order of priority. The dynamic unit selection routine may determine if one or more of the units on the prioritized list of suitable units is capable of being acquired and may select the first unit on the prioritized list of suitable units that is capable of being acquired as the unit to be used by the control routine.

39 Claims, 4 Drawing Sheets

DYNAMIC UNIT SELECTION IN A PROCESS CONTROL SYSTEM

FIELD OF THE INVENTION

The present invention relates generally to process control networks and, more specifically, to dynamically selecting hardware units or equipment for use in a process, such as a batch process, during a run of the process.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. More recently, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process.

Certain types of process control networks, such as those used in batch processes, typically include multiple sets of replicated equipment designed to have the same or similar equipment which performs essentially the same function within the processes. Thus, for example, a cookie manufacturing plant may have multiple sets of mixing equipment, multiple sets of baking equipment, and multiple sets of packaging equipment, with some or all of the individual mixers being capable of operating in parallel and of being connected to operate in series with some or all of the baking equipment and the packaging equipment. In such a system, it is desirable to be able to use the same control algorithm or routine to control the operation of any particular set of replicated equipment to thereby reduce the number of control routines that must be created and stored within the controller. However, these control algorithms must be written so that, when executed, they specify the equipment of a particular unit being used at the time. Typically, however, a batch procedure preforms a number of different steps or stages in sequence, finishing the first stage before beginning the second stage. Thus, in the cookie manufacturing plant described above, the batch procedure runs a first sub-process or step to control the mixing equipment, then runs a second sub-process to run the baking equipment on the product made by the mixing equipment and then runs a third sub-process that controls the packaging equipment to package the product produced by the baking equipment.

In prior process control systems, the user typically has to specify which unit or set of units are to be used in each stage or unit procedure of a particular batch run at the time that the batch procedure or recipe (i.e., the general batch instructions) are written or, alternatively, at the time the batch procedure first begins to operate, i.e., at the time that the first stage or unit procedure of the batch process is started. This, of course, means that the user has to select the equipment or units that are to be used in the later stages or unit procedures of the batch run, which are sometimes not needed for hours or even days after the time that the batch procedure is first begun, at the time that the batch procedure is first written or first started. This preselection means that the selected equipment is tied up and cannot be used until the entire batch run is complete, or at least until the portion which uses the designated equipment has completed. This preselection also requires that the designated units be ready and available (i.e., up and running) when the stage of the batch process that uses those units begins, which can lead to problems in completing the batch run due to equipment failure within the designated units, etc. This preselection also means that the user or operator has to schedule equipment well in advance of its use, which reduces the operator's options in scheduling other runs of the same batch process or runs of other batch processes that might use that equipment in the meantime.

While some known control systems are capable of enabling a user to manually select a particular unit to perform a particular part of an overall batch process at the time that the particular part or sub-process of the batch procedure is to begin, these systems do not automatically select a group of candidate units that are capable of being selected and do not prioritize the units which are available. As a result, manual selection of the units at the time that the units are to be used still requires a lot of forethought and knowledge on the part of the operator or user to assure that the right unit is being selected at the appropriate time.

SUMMARY OF THE INVENTION

A process control system includes one or more process control routines that dynamically select one or more of the units (or sets of equipment) to be used during any unit stage or unit procedure thereof based on user input, predetermined priorities or criteria related to properties of the available units, previous unit selection decisions made during the run of the process, equipment train information reflecting pre-established connection interrelationships between different units, information pertaining to the classes into which the units belong, etc. Selection of a unit can be performed at the time that the unit is to be used, instead of when the batch run is begun, which enables dynamic scheduling of the different units which, in turn, allows better use of the different units within a system running multiple processes or batches. This dynamic selection also alleviates the need to assure that a certain unit is on-line and available at a particular time merely because a batch run specifying that unit for a downstream sub-process was begun at some earlier time.

A general batch procedure is written to include one or more unit procedures (i.e., a set of operations to be performed on a single unit). One or more of the unit procedures includes a call to a dynamic unit selection procedure which determines a set of candidate units that can be used for the sub-process being performed based on an equipment train or process cell in which the batch procedure is being run. The dynamic unit selection procedure then identifies suitable units for the particular unit procedure of the batch run being implemented based on properties of the units, previous selection criteria, user commands, etc. The dynamic selection routine may then prioritize the suitable units based on user provided priority information or other criteria previously established for these units. The dynamic selection procedure then acquires a unit for use by going through the prioritized list of suitable units and seeing if each consecutive unit on the prioritized list is on-line and available, i.e., not currently being used and otherwise available for use. The dynamic selection procedure acquires the first unit that is available and then returns the name and other information pertaining to this unit to the unit procedure, which begins to perform operations using the newly selected unit.

DESCRIPTION OF THE PREFERRED EMBODIMENTS

Figure 1:
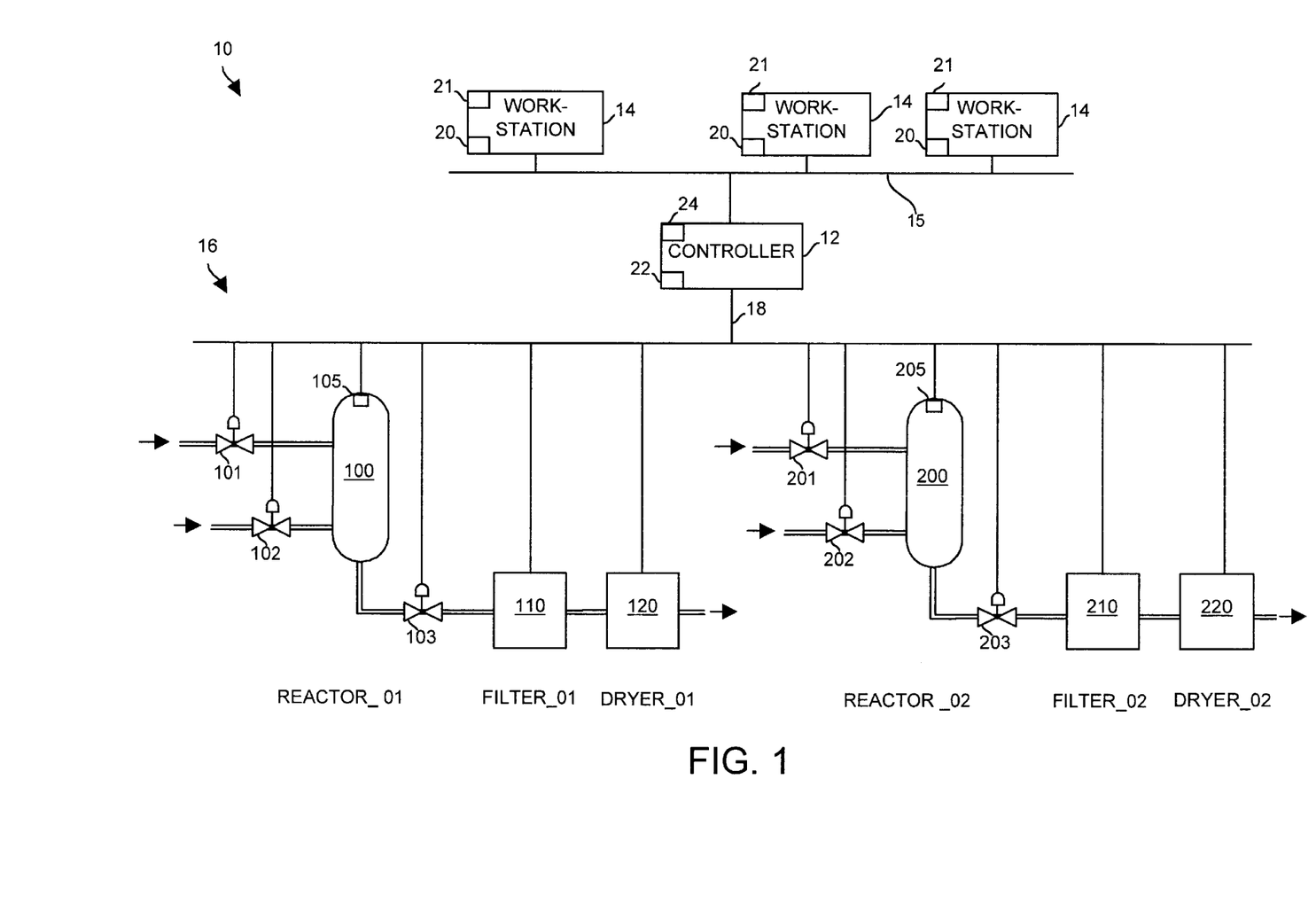
FIG. 1 is a partial block diagram, partial schematic diagram of a portion of a process control network that uses one or more control routines that dynamically select units during operation thereof.

Referring now to FIG. 1, a process control network 10 includes a process controller 12 coupled to numerous workstations 14 via, for example, an Ethernet connection 15. The controller 12 is also coupled to devices or equipment within a process (generally designated by the reference numeral 16) via an input/output (I/O) device (not shown) and a set of communication lines or a bus 18. The controller 12, which may be by way of example only, the DeltaV™ controller sold by Fisher-Rosemont Systems, Inc., is capable of communicating with control elements, such as field devices and function blocks within field devices distributed throughout the process 16 to perform one or more process control routines to thereby implement desired control of the process 16. These process control routines may be continuous or batch process control routines or procedures. The workstations 14 (which may be, for example, personal computers) may be used by one or more engineers or operators to design process control routines to be executed by the controller 12, to communicate with the controller 12 so as to download such process control routines, to receive and display information pertaining to the process 16 during operation of the process 16 and to otherwise interact with the process control routines executed by the controllers 12. Each of the workstations 14 includes a memory 20 for storing applications, such as configuration design applications, and for storing data, such as configuration data pertaining to the configuration of the process 16. Each of the workstations 14 also includes a processor 21 that executes the applications to enable a user to design process control routines and to download these process control routines to the controller 12. Likewise, the controller 12 includes a memory 22 for storing configuration data and process control routines to be used to control the process 16 and includes a processor 24 that executes the process control routines to implement a process control strategy. If the controller 12 is a DeltaV controller, it may provide a graphical depiction of the process control routines within the controller 12 to a user via one of the workstations 14 illustrating the control elements within the process control routine and the manner in which these control elements are configured to provide control of the process 16.

In the example process control network 10 illustrated in FIG. 1, the controller 12 is communicatively connected via the bus 18 to two sets of similarly configured equipment, each set having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith.

As illustrated in FIG. 1, the controller 12 is communicatively coupled to the valves 101–103, 201–203, to the devices 105, 205, to the filters 110, 210 and to the dryers 120 and 220 (and to the other equipment associated therewith) via the bus 18 to control the operation of these elements to perform one or more operations with respect to these units. Such operations may include, for example, filling the reactor vessels, or dryers, heating the material within the reactor vessels or dryers, dumping the reactor vessels or dryers, cleaning the reactor vessels or dryers, operating the filters, etc.

The valves, sensors and other equipment illustrated in FIG. 1 may be any desired kind or type of equipment including, for example, Fieldbus devices, standard 4–20 ma devices, HART devices, etc. and may communicate with the controller 12 using any known or desired communication protocol such as the Fieldbus protocol, the HART protocol, the 4–20 ma analog protocol, etc. Still further, other types of devices may be connected to and be controlled by the controller 12 in accordance with the principles of the present invention. Also, other controllers may be connected to the controller 12 and to the workstations 14 via the Ethernet communication line 15 to control other devices or areas associated with the process 16 and the operation of such additional controllers may be coordinated with the operation of the controller 12 illustrated in FIG. 1 in any desired manner.

Generally speaking, the process control system of FIG. 1 may be used to implement batch processes in which, for example, one of the workstations 14 or the controller 12 executes a batch executive routine or a batch procedure. The batch procedure (which is typically run in one of the workstations 14) is a high level control routine that directs the operation of one or more unit procedures, which are sub-routines or processes that operate on a single unit, such as one of the reactor units, the filter units, the dryer units, or other equipment. Each unit procedure (which is also generally run on the workstation 14) may perform a series of operations, each of which may perform one or more phases on a unit. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases, while a unit procedure is a series of one or more operations performed on a single unit and is typically implemented as a set of operation calls. As a result, any unit procedure can include one or more phases and/or one or more operations. In this manner, the batch executive routine performs different steps or stages (i.e., unit procedures) needed to produce a product, such as a food product, a drug, etc. To implement different unit procedures, operations and phases, the batch procedure uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run, running a filter to filter the output of a reactor and then running a dryer to dry the product created in the reactor vessel. Each of the series of steps associated with a different unit defines a unit procedure of the batch run and the batch executive routine or batch procedure within the controller 12 will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units, the filter units and the dryer units illustrated in FIG. 1, control routines may be used to control other desired devices to perform any other desired batch process runs or to perform continuous process runs, if so desired.

As will also be understood by those skilled in the art, the same phases, operations or unit procedures of a batch process can be implemented on each of the different reactor units of FIG. 1 at the same or at different times. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

Figure 2:
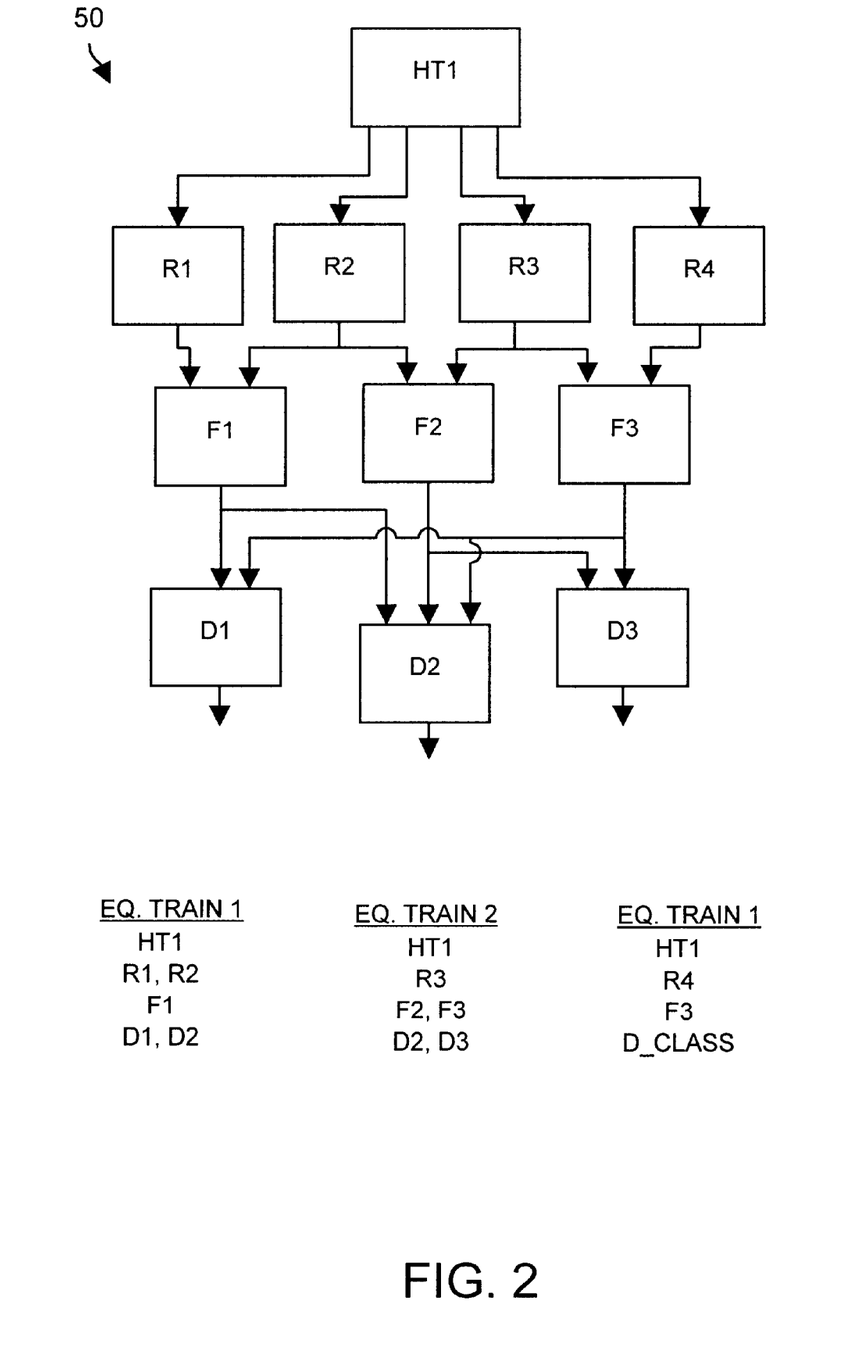
FIG. 2 is a block diagram of a set of interconnected equipment making up three equipment trains within the process control network of FIG. 1.

Referring now to FIG. 2, a process control system 50, of which the system 10 illustrated in FIG. 1 may be a part, includes one headtank HT1, four reactor units R1, R2, R3 and R4, three filter units F1, F2 and F3 and three dryer units D1, D2 and D3 operatively coupled together in various manners to perform a procedure that uses a headtank, a reactor, a filter and a dryer. The process control units of the system of FIG. 2 may be categorized into sets of equipment trains, wherein each equipment train has a one or more of each of the units necessary to perform a batch run physically or operatively connected in series so as to be capable of performing an entire batch run. Of course, a batch run or procedure can include one or more unit procedures or stages and, thus, a batch procedure need only use one unit, in which case, an equipment train will include one type of unit therein.

In the set-up of FIG. 2, the single headtank unit HT1 is operatively connected to each of the four reactor units R1, R2, R3 and R4. The reactor units R1 and R2 are each connected to the filter unit F1 which, in turn in operatively connected to each of two dryer units D1 and D2. The reactor unit R2 is also connected to the filter unit F2 (as also illustrated in FIG. 1), which is connected to dryer units D2 (illustrated in FIG. 1) and D3 (not illustrated in FIG. 1). Likewise, the reactor unit R3 is operatively connected to the filter units F2 and F3, each of which is connected to the dryer units D2 and D3. Still further, the reactor unit R4 is operatively connected to the filter unit F3 which is operatively connected to all of the dryer units D1, D2 and D3. As a result, at least three equipment trains are defined. The first equipment train includes the headtank unit HT1, the reactor units R1 and R2, the filter unit F1 and the dryer units D1 and D2. The second equipment train includes the headtank unit HT1, the reactor unit R3, the filter units F2 and F3 and the dryer units D2 and D3. The third equipment train includes the headtank unit HT1, the reactor unit R4, the filter unit F3 and each of the dryer units D1, D2 and D3, i.e., each of the dryer units in the dryer unit class D_Class. Of course, other equipment trains may be provided also, such as HT1, R2, F2 and D2 or D3. Furthermore, equipment trains could have more than four or fewer than four types of units as well as other types of units associated therewith, depending of the procedure being performed.

It will be noted that equipment trains identify the sets of units physically coupled together to perform a process or part of a process, and these equipment trains can change as interconnections between units are modified, as units are added to or removed from the process, etc. Furthermore, equipment trains can include equipment scattered throughout the process and are not necessarily limited to equipment within what is generally known in the art as a process cell. Typically, equipment trains are used in processes where interconnections between different units are frequently changed or are fairly flexible. On the other hand, process cells, which also specify a set of units interconnected together, are typically used in processes in which the equipment or the units are interconnected via fairly fixed mechanisms and are not changed that frequently. Thus, while there are differences between these two terms, for the purpose of this discussion, these two terms are used interchangeably to indicate a set of units (or a even a single unit) physically interconnected together to perform a process, such as a batch process.

Figure 3:
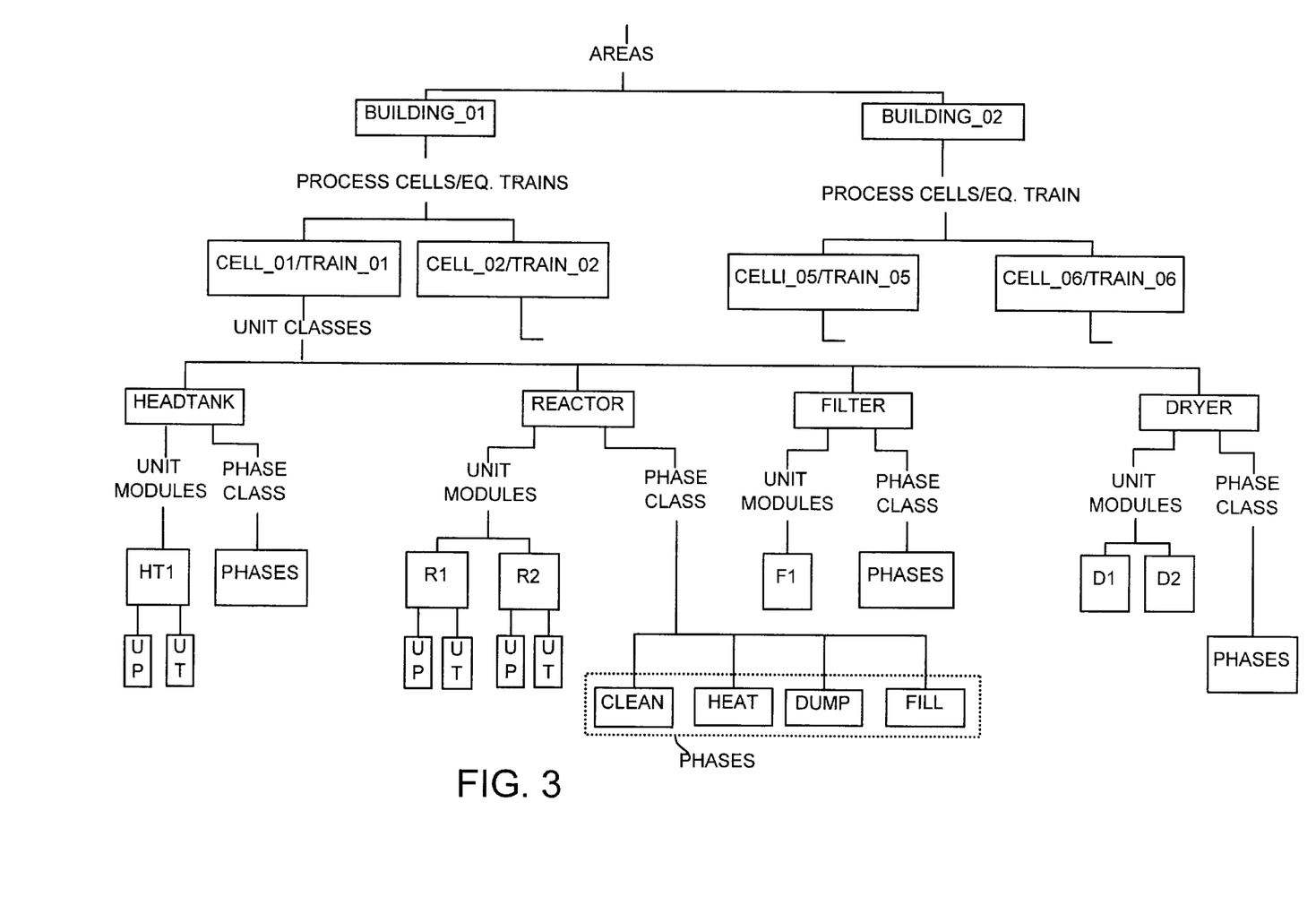
FIG. 3 is a block diagram of an object structure illustrating a conceptual configuration of the process control network of FIGS. 1 and 2.

Generally speaking the manner in which the operation of the process 16 of FIGS. 1 and 2 is managed by or organized within the controller 12 is based on the interaction of a number of objects, each of which has attributes and each of which may have one or more methods associated therewith. Each object can have a number of sub-objects (or classes) associated therewith, each sub-object can have sub-objects, and so on. In a generic sense, the overall control strategy for the process 16 is configured using an object oriented programming paradigm, which is known in the art and so will not be described in further detail herein. FIG. 3 depicts an example object hierarchy illustrating the interrelationship between a number of objects associated with the process control network 10 and 50 of FIGS. 1 and 2. This hierarchy will be used to explain the manner in which a process control routine is created on, for example, one of the workstations 14 and is then downloaded and executed within the controller 12 and for identifying the context in which this process control routine operates. It will be understood, however, that the manner in which process control routines are created and stored in the controller 12 may be based on other object hierarchies, or on object hierarchies having any other desired elements or objects therein.

The object tree of FIG. 3 illustrates specific objects with boxes while general categories of objects (or object types) are indicated above the objects in the tree with no box. As illustrated in FIG. 3, the process control network 10 includes one or more areas which may be, for example, buildings or other geographical area designations within a plant. In the object tree of FIG. 3, the process 16 has two area objects named Building_01 and Building_02. Each area object may be divided into process cells or equipment trains, each of which identifies a different aspect of the process being performed in the area or a set of interconnected equipment in the area. The Building_01 area object of FIG. 3 is illustrated as including at least two process cell objects or equipment train objects designated Cell_01/Train_01 and Cell_02/Train_02. While the object structure of FIG. 3 indicates that Cell_01 is the same as Train_01, it will be understood that an equipment train is not limited to equipment that is in what has traditionally been called a single process cell, but could include equipment from different process cells. For the sake of illustration, however, these terms are used interchangeably with respect to the equipment described in FIG. 3. Cell_01/Train_01 may, for example, be related to making a component of a product used in Cell_02/Train_02. Each cell object or train object may include zero, one or more unit classes, which identify different categories or groupings of hardware used in the process cell or equipment train.

A unit class is a named object that holds a common configuration of a set of replicated equipment and, more particularly, is a collection of units that have very similar, if not identical, process instrumentation, each of which performs a very similar, if not identical, function within a process. Unit class objects are typically named to describe the types of units within the process control system to which they belong. FIG. 3 illustrates a HeadTank unit class, a Reactor unit class, a Filter unit class and a Dryer unit class associated with the Cell_01/Train_01 object. Similar unit classes would be found in Cell_02/Train_02 while other groupings of units could be associated with other cells and or equipment trains. Of course, in most process control networks, many other types of unit classes will be provided or defined as well.

As illustrated best for the Reactor unit class of FIG. 3, each unit class object may have unit module objects (i.e., units) and phase class objects (i.e., phases) associated therewith. Unit module objects generally specify certain instances of replicated hardware within the named unit class while phase classes generally specify the phases that can be applied to the unit modules associated with the unit class. More particularly, a unit module object is a named object that holds all of the variables and unit phases for a single process unit and is typically named to identify specific process equipment. For example, the Reactor unit class of Cell_01/Train_01 of FIG. 3 has the R1 and R2 unit modules, which correspond to the Reactor_01 and Reactor_02 modules illustrated in FIGS. 1 and 2. The HeadTank unit class of Cell_01/Train_01 includes the single unit module of HT1 (as illustrated in FIG. 2). Similarly, Filter unit class of Cell_01/Train_01 has the specific filter module F1 while the Dryer unit class of Cell_01/Train_01 has the dryer units of D1 and D2 associated therewith. Similarly, the Cell_02/Train_02 will have unit classes of a HeadTank (having a single unit module of HT1), a Reactor (having a single reactor unit module of R3), a Filter (having filter unit modules F2 and F3) and a Dryer (having dryer unit modules of D2 and D3) all as defined by the equipment trains illustrated in FIG. 2. For the sake of simplicity, the unit classes associated with the equipment trains 2 and 3 of FIG. 2 are not illustrated in FIG. 3.

Phase classes are named objects that hold the common configuration for a phase that can run on the multiple units belonging to the same unit class and, if desired, on multiple different unit classes. In essence, each phase class is a different control routine that is created and is used by the controller 12 to control unit modules within the same or different unit classes. Typically, each phase class is named in accordance with the verb that describes an action performed on a unit module. For example, as illustrated in FIG. 3, the Reactor unit class has a Fill phase class which is used to fill any one of the reactor vessels 100 or 200 of FIG. 1, a Heat phase class which is used to heat any one of the reactor vessels 100 or 200 of FIG. 1, a Dump phase class which is used to empty any one of the reactor vessels 100 or 200 of FIG. 1, and a Clean phase class which is used to clean any one of the reactor vessels 100 or 200 of FIG. 1. Of course there can be any other phase classes associated with this or any other unit class. While no specific phase classes are illustrated in FIG. 3 for the HeadTank, Filter and Dryer unit classes, at least one phase class exists for each and is used by a batch procedure to implement a part of a batch process, unit procedure or operation using the unit module with which the phase class is associated.

A phase class may generally be thought of as a subroutine to be called by an operation of a unit procedure (all within a batch executive routine) to perform some function needed in an overall batch process, as defined by the recipe for that batch process. A phase class may include zero or more phase input parameters, which are basically the inputs provided to the phase class subroutine from the batch executive routine or another phase class, zero or more phase output parameters which are basically the outputs of the phase class subroutine passed back to the batch executive routine or to another phase class, zero or more phase messages, which may be messages to be displayed to the user regarding the operation of the phase class, information related to other phase classes with which this phase class is associated in some manner, and zero or more phase algorithm parameters which cause parameters to be created in phase logic modules or unit phases based on this phase class. (Unit phases are simply the instantiated versions of the phase class for a particular unit.) These phase algorithm parameters are used as temporary storage locations or variables during the execution of the phase and are not necessarily visible to the user or to the batch executive routine. Each phase includes one or more phase algorithm definitions (PADs) which, generally speaking, are the control routines used to implement the phase. Also, each phase class has a list of associations to zero, one, two or more unit classes, and this list defines the unit classes for which this phase class and, consequently, the PAD of the phase class, can be applied. Thus, the same phase class can be associated with the same unit classes of different process cells or equipment trains or even with different unit classes of the same or different process cells or equipment trains.

Referring again to the unit modules in FIG. 3, each unit module object includes zero or more unit tags (UT) or parameters having initial values. The UT objects are illustrated only for the HT1, R1 and R2 modules in FIG. 3. These parameters may correspond to settings and configuration parameters of the equipment associated with the unit module. These unit tags may define, for example, the capacity of the unit, the materials of which the unit is made, the unit manufacturer, or any other data or parameters associated with the unit. This data can be fixed, such as manufacturing data, or variable, such as the last time the unit was used, the last process or material placed in the unit, etc. Still further, each unit module object may have alarms, resource identifications, a control display (such as a human-machine interface picture), a list of the resources that this unit module requires, process cell information, etc. associated therewith.

Each unit module also includes one or more unit phase (UP) objects, which are named objects that represent instances of phase classes associated with or created for the particular unit module. In the configuration system (i.e., in one of the workstations 14), the unit phase object represents a component of a unit module that can be independently changed and downloaded. In the run-time system (i.e., in the controller 12), the unit phase object represents a phase logic that can be independently operated (started, stopped, held, aborted, etc.) by the controller 12 on a unit module; potentially in parallel with other unit phases simultaneously active on different unit modules. In essence, the unit phase object is the instantiated version of one of the phase classes that has been resolved for the particular unit module to which the unit phase object belongs. The UP objects are illustrated only for the HT1, R1 and R2 units in FIG. 3.

Importantly, each unit procedure has a unit allocation object associated herewith. This unit allocation object (not shown in FIG. 3) defines certain unit module parameters and/or user specified priorities that will be used to dynamically select a particular unit module during the operation of a batch process. A different unit allocation object may be created (by the user when configuring the system) for each different unit procedure. As a result, one or more phase classes (or operations) associated with, for example, the same unit class may use the same unit allocation table. Generally speaking, the unit allocation table for a unit procedure holds preferences and/or selection criteria or procedures used to dynamically select a particular unit within a unit class or to prioritize a list of units within a unit class during the run of a process control routine, such as a batch procedure.

As is known, a batch control routine or batch procedure is created to perform a particular batch process on a group or set of equipment which may include, for example, any of the reactor units (R1, R2, R3, R4), the filter units (F1, F2, F3) and the dryers (D1, D2, D3). Generally, such a batch procedure will call or implement one or more unit procedures, each of which is associated with a particular unit, when that unit procedure needs to be executed during the overall batch procedure. However, instead of specifying the particular units to be used in each of the different unit procedures when the batch procedure is written or first started to be executed, the batch procedure includes a dynamic selection routine that selects a unit to be used for a each particular unit procedure or stage of a batch procedure when that unit procedure or stage is to be performed. The timing of this selection can be long after the batch procedure is written and first started to run. In fact, in some instances, the dynamic unit selection for later stages of a batch procedure can occur hours or even days after a batch procedure is first started.

Generally speaking, a batch procedure will be written to call different unit procedures associated with different sets (or sometimes the same set) of units or equipment. When written, the batch procedure can specify a certain or particular process cell or equipment train for which it is to be run, or it can be written to allow a user or operator to select a process cell or equipment train to be used at the start of the batch procedure. However, once a particular process cell or equipment train is selected and the batch procedure is started, the batch procedure is limited to using equipment or unit modules associated with the selected process cell or equipment train.

At the beginning of each unit procedure associated with a batch procedure, the batch procedure will make a selection of the particular unit to be used during the unit procedure based on a number of criteria. The batch procedure (or unit procedure) may call a subroutine specifically designed to make a dynamic unit selection using the information in the unit allocation table object associated with a unit procedure to be run, as well as the unit parameter information and other information stored in the unit tags for each of the unit modules. Such a dynamic selection subroutine may perform the general steps of identifying candidate or possible units to be used, selecting from among the candidate units those units suitable for this particular batch procedure, prioritizing the suitable units according to some priority scheme and then scrolling through the list of prioritized suitable units in order of priority to see if each unit is available, i.e., on-line and not currently being used for a different procedure. The first unit, in the order of priority, that is available to be acquired to run the unit procedure is then selected as the unit for use by the batch procedure. The batch procedure or unit procedure then implements operations using the unit phases for the selected unit to thereby perform the next stage of the process.

To select a particular unit for any particular unit procedure of a batch procedure, the selection routine, which may be a separate subroutine, may be repeated throughout the batch procedure or may be performed in any other desired manner, first determines, based on the unit procedure to be performed, a list of candidate or possible units. This list of units will typically be all of the units of a particular unit class within the process cell or equipment train on which the batch procedure is being run. As a result, this list can be determined from an identification of the process cell or equipment train in which the batch procedure is being used and from an identification of the unit class, phase or phase class to used.

Next, the selection routine determines which of the possible units are suitable units for this particular batch procedure. The selection routine may, for example, implement or execute a selection expression that uses one or more of a set of selection criterion to determine if each unit within the list of possible units is suitable for this batch procedure. Indications of the selection criteria to be used (if any) may be established when the batch procedure is written, when it is run or at any other desired time. The selection criteria may, for example, be passed to the selection routine by the batch procedure, may be specified by a user, and/or may be stored in the unit allocation object for a unit procedure. The selection criteria may, for example, be based on unit properties. In fact, there are many properties, such as the size of a unit, the materials from which a unit is constructed, and other properties associated with each of the units that may differ from unit to unit but that may be important in considering which unit to use for a particular batch run. For example, if a batch procedure is making a 500 gallon batch, it will require a reactor having at least a 500 gallon capacity. Likewise, if the batch procedure is using caustic materials, it may require a reactor having a glass lined tank. As a result, the selection criteria may specify tests to be performed based on parameters of the units. In this case, the selection routine may compare the selection criteria with the parameters of each unit as stored in that unit tag object for each unit to determine if a unit is suitable. The unit parameters used to test selection criteria may be fixed, such as capacity or materials of construction of the unit, or may be dynamic, such as when the unit was last used, what the last material processed by the unit was, etc. Furthermore, unit parameters can be of various types including, for example, string, numeric, integer, named sets, floating points values, etc.

The selection criteria may also or alternatively include recipe constraints. For example, a downstream unit procedure may need to be performed in the same unit as a previous upstream unit procedure, in which case the selection criteria in the form of a recipe constraint forces the downstream unit procedure to select the same unit that performed the upstream unit procedure. In, for example, a batch process that runs, in a consecutive manner, two unit procedures that each execute a fill, a heat and a dump phase on a reactor, the selection routine may select any of the available reactors when implementing the fill phase of the first such unit procedure. However, when implementing the heat and dump phases, the selection routine has to select the same reactor that was filled in the fill phase and, thus, for these phases, is limited by the recipe (i.e., by an earlier selection) to a particular unit. Likewise, if the second unit procedure must be run on the same unit as the first unit procedure, it may be constrained to do so by a recipe constraint.

Likewise, the selection criteria may include operator indications as to whether a particular unit is to be used in a process. Thus, for example, an operator or user may set a selection flag associated with a unit to prevent that unit from being selected by the selection routine (or, alternatively, to cause that unit to be selected by the selection routine). Such a selection flag may be set by the user during runtime, may be set in the unit tag object for the particular unit, or may be set any in other desired manner at any desired time.

In any event, the selection routine can access the properties of each of the units identified as a possible unit and compare the parameters of each of those units (as stored in the unit tags) to selection criteria provided by the batch procedure, stored in the associated unit allocation table, or specified by a user, as well as determine if any recipe constraints exist. Of course, other selection criteria could be used as well.

After the list of units which meet the selection criteria is determined, the dynamic selection routine may prioritize the list using any desired prioritization method. Unit prioritization may be performed based on one or more unit parameters, such as those defined above or based on any other criteria. Of course, priority expressions, which may be any type of mathematical, boolean, etc. expressions using any priority criteria may be provided by the batch routine or by a user to perform prioritization. In one embodiment, the suitability selection expression and the prioritization expression are created and stored in the unit allocation table object for each unit phase or unit class and this unit allocation table object is used by the selection routine to perform both selection and prioritization of the units identified as possible units.

After determining a prioritized list of the suitable units, the selection routine can then scroll through the list, in the order of priority, and try to acquire each of the suitable units until the selection routine finds a unit that is currently capable of being acquired because it is on-line and not currently being used by another batch procedure or process control routine. As soon as the selection routine acquires a unit on the prioritized list of suitable units, the selection routine returns the name or identification of this unit to the batch procedure (or unit procedure), or the batch procedure otherwise uses this determination to run the unit procedure on the determined unit. If none of the units is available, the selection routine can wait a predetermined amount of time and then start at the top of the prioritized list and try to, in turn, acquire the units on the list. This procedure can be repeated until one of the units on the list becomes available or is acquired.

If desired, the selection routine can also enable a user to make the selection of a unit. In this case, the selection routine can present the list of suitable units to the user and enable the user to select one of those units. In this configuration, the user does not need to consider whether a unit is capable of use based on its location or interconnection within the process or whether a unit is suitable for use in a particular batch procedure, because the selection routine has already made these determinations. Likewise, the selection routine may prioritize the list of suitable units, making the user's choice easier.

Of course, when creating or writing the batch procedure, an engineer can simply have the batch procedure call the dynamic unit selection routine whenever a new unit procedure is to be performed. The engineer can create a unit allocation table object for each unit procedure, unit class, unit object, etc. to be used by the selection routine to dynamically select units. This unit allocation table may, for example, include a suitability expression and a priority expression to be implemented for the associated unit procedure, unit classes, unit modules, etc. The engineer must also assure that the unit tags for each unit module includes the unit parameters needed by the selection routine. The engineer can then download the batch procedure, the selection routine, the unit allocation tables and the unit tags to the appropriate databases within the appropriate controller 12 and/or workstation 14, at which time the batch procedure can be executed.

Figure 4:
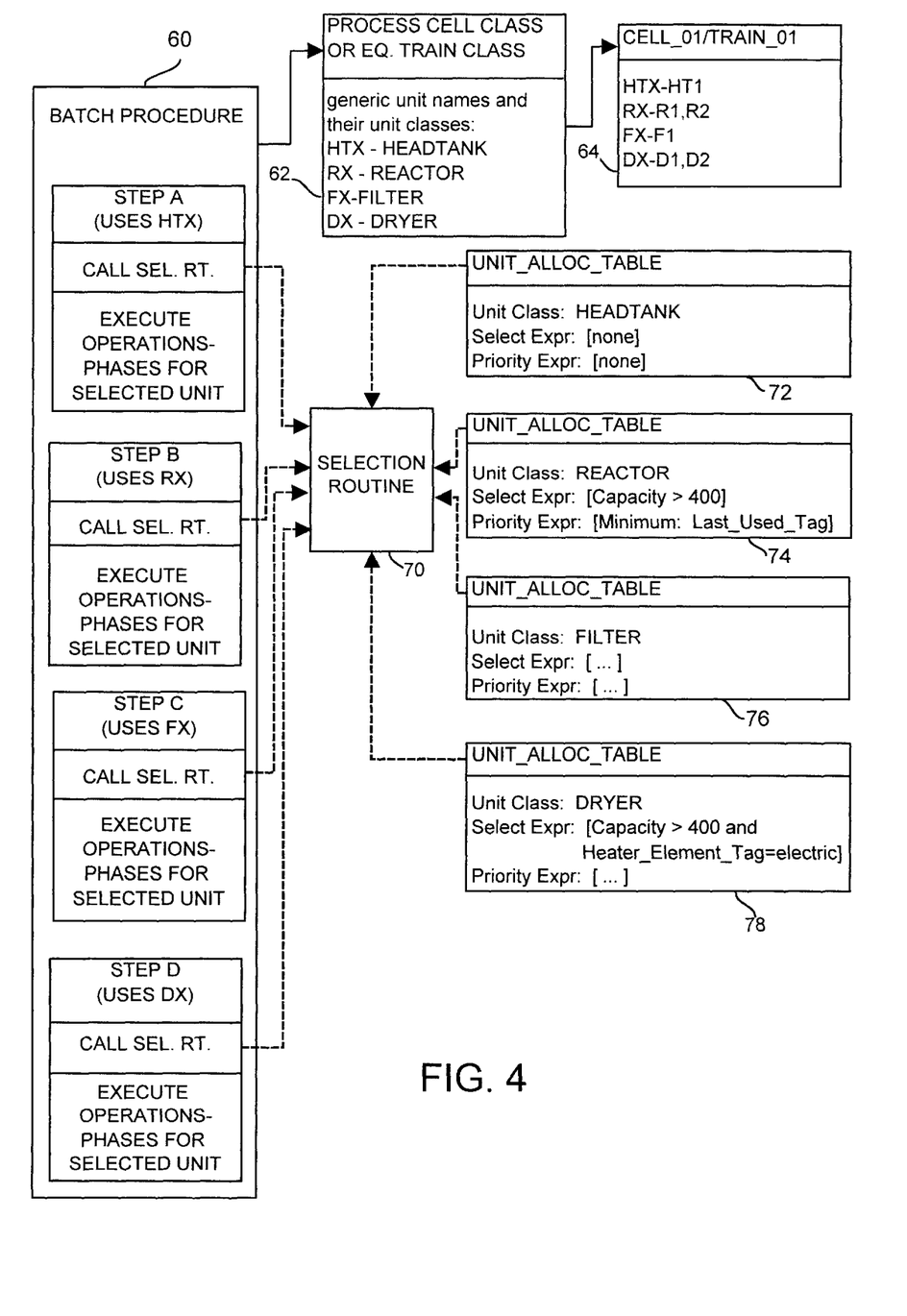
FIG. 4 is a block diagram of a process control routine that dynamically selects units during the operation of each of a number of sub-processes or unit procedures associated therewith.

Referring now to FIG. 4, a batch procedure 60 is illustrated as including four steps, stages or unit procedures (labeled steps A, B, C and D) which are associated with or use four different units including an unspecified headtank unit (HTX), an unspecified reactor unit (RX), an unspecified filter unit (FX) and an unspecified dryer unit (DX). As indicated by the box 62, at the creation of the batch procedure 60, the batch procedure is specified to be run on a process cell class (which may have one or more process cells associated therewith) or on an equipment train class (having one or more equipment trains associated therewith). When the batch procedure 60 is run (in, for example, the workstation 14 of FIG. 1), it may ask the user to specify a particular process cell or equipment train to be used, which remains fixed during the entire run of the batch procedure 60. This selection is indicated by the box 64 in FIG. 4 in which, in this example, Cell_01/Train_01 is selected. Of course, if desired, the batch procedure 60 may be limited to a particular process cell or to a particular equipment train when first created.

After the process cell or equipment train is specified for the batch procedure 60, the unit classes and the unit modules of each of the unit classes that can be used by the batch procedure 60 are effectively established as the unit classes and unit modules associated with the selected equipment train or process cell. Box 64 illustrates that, for a choice of Cell_01/Train_01, the unit classes include the headtank, reactor, filter and dryer classes and the unit modules include HT1, R1 and R2, F1, and D1 and D2.

The batch procedure 60 then begins by implementing step A (i.e., unit procedure A). As part of step A, which is a unit procedure to be run on the headtank class, or shortly before the beginning of step A, the batch procedure 60 may call a selection routine 70 to dynamically select a headtank to be used during step A. The selection routine 70 determines that the only possible headtank that can be used for the step A is HT1 because this is the only headtank within the specified process cell or equipment train. As a result, the selection routine 70 need not use or consult the unit allocation table 72 for the headtank unit procedure and, in fact, such an object need not be created for the headtank unit procedure. The selection routine 70 then determines if HT1 is available, i.e., if it can be acquired. If so, the selection routine 70 returns an indication of HT1 to the batch procedure 60 as the unit to be used. The batch procedure 60 then acquires HT1 and performs the operation(s) and phase(s) associated with the headtank unit procedure on HT1 to thereby perform Step A.

After completing step A, the procedure 60 implements Step B, which is a unit procedure associated with a reactor. To do so, the unit procedure B or the batch routine 60 calls the dynamic selection routine 70 which selects one of the possible reactors R1 or R2 for use in Step B. As outlined above, the dynamic selection routine 70 may determine the available units in the reactor class associated with Cell_01/Train_01, these reactors being R1 and R2. (Of course, the selection routine 70 need not do this again after this determination is made at the beginning of the batch procedure 60). Next, the selection routine 70 accesses the unit allocation table 74 for the reactor unit procedure, to obtain the suitability selection criteria (or expression) and/or the priority criteria (or expression) to be applied in making a selection of a reactor in Cell_01/Train_01. As illustrated in FIG. 4, the unit allocation table 74 for the reactor unit procedure has a selection expression that requires a capacity of greater than 400. (Of course other suitability criteria could be used instead or in addition). The selection routine 70 then determines if each of the reactors R1 and R2 has a capacity greater than 400. If so, the selection routine 70 ranks the reactors R1 and R2 in priority based on the priority expression in the unit allocation table 74. It will be noted that priority expression illustrated in FIG. 4 specifies that the selection routine 70 should place the unit which has been dormant the longest at the highest priority. (Of course, other priority expressions may be used as well.) Doing so, the selection routine 70 may then determine, from the unit parameters stored in the unit tags for each of the units R1 and R2, which has been used least recently and prioritizes these units in that order. Thereafter, the selection routine 70 tries to acquire the unit R2 (which, for the sake of this example, is assumed be ranked at the highest priority). If the reactor R2 can be acquired because it is not currently being used and is not otherwise occupied, the selection routine 70 returns an indication of the R2 unit to the batch procedure 60 which then uses the reactor R2 to perform the operations and phases associated with the unit procedure B. Of course, the selection routine 70 may also allow an operator to select between R1 and R2 by displaying the prioritized list of R2, R1 to the operator and prompting the user to select which of the suitable reactors to use.

In any event, after running step B, the batch procedure 60 begins to implement step C, which is a unit procedure that uses a filter unit class. (It will be understood that there can be many different unit procedures associated with any particular unit class). The batch procedure 60 may call the dynamic selection routine 70 to determine which units are available for use based on the process cell or equipment train currently being used, to determine which of these units are suitable according to the selection criteria stored in the unit allocation table 76 and other constraints, such as recipe constraints which may be provided by the batch procedure 60 or user constraints which may be provided by user input. Because only one filter is in Cell_01/Train_01, the selection routine 70 need not consult the unit allocation table 76, although it could if it is still desired to determine if the only unit available meets the suitability expression. The selection routine 70 can then determine if the filter F1 is available and, if so, returns an indication of F1 to the batch procedure 60 which uses the unit phase(s) for F1 and the F1 unit module to implement step C.

Similarly, after running step C, the batch procedure 60 begins to implement step D, which uses a dryer to implement one or more dryer operations and phases. The batch procedure 60 may call the dynamic selection routine 70 to determine which units are available for use based on the process cell or equipment train currently being used, to determine which of these units are suitable according to the selection criteria or expression stored in the unit allocation table 78 and other constraints, such as recipe constraints. As illustrated in FIG. 4, the suitability expression within the unit allocation table 78 indicates that the dryer to be chosen must have a capacity greater than 400 and must be an electric dryer. The selection routine 70 checks the unit parameters for each of the available dryer units in the Cell_01/Train_01 (i.e., D1 and D2) to see if they meet the suitability expression in the unit allocation table 78. The unit selection routine 70 then ranks the units that are found to be suitable in priority based on the priority expression in the unit allocation table 78 (not actually shown), and then tries to acquire each of the units in the prioritized order. The first dryer unit within the prioritized list of suitable dryers that is found to be available is returned to the batch procedure 60, which acquires this unit and executes the unit procedure D using the unit phases for this unit, as specified by the operation(s) associated with the unit procedure D.

Of course, the suitability expressions and the priority expressions in the unit allocation tables can be configured in any desired manner using any desired programming language or technique. If desired, a different unit allocation table may be created for each unit procedure, for each operation or for each phase of a unit procedure or, if desired, for each unit class or even for each unit associated with a unit class. Furthermore, the suitability and priority expressions or criteria can be specified, used and stored in any other desired manner. Thus, for example, a user or an operator may provide these expressions or criteria via an interface such as an OPC interface. Still further, the dynamic selection routine 70 can perform only one of suitability or a priority determination and need not perform both. Likewise, the dynamic selection routine 70 could perform other operations as desired, such as checking recipe constraints and user input constraints on each of the possible or suitable units. Also, the dynamic selection routine 70 itself could be implemented in any desired manner in any desired type of programming environment. For example, the dynamic selection routine 70 could be split, performing recipe and user constraint determinations as instructions within the batch procedure 60 and performing suitability determinations and priority determinations as part of a subroutine. Also, the dynamic selection routine 70 could have a portion that operates at the beginning of the batch procedure 60 to determine, once for the entire batch procedure 60, which units are the available units in each of the classes associated with the selected process cell or equipment train. The routine 70 may then use this list each time it makes a dynamic unit selection. Also, the batch procedure 60 need not call the routine 70 if only one available unit exists within a process cell or an equipment train for a particular phase or operation of the process.

Likewise, it will be understood that process control routines, such as batch procedures, using a dynamic unit selection routine that selects a unit for use during runtime, can be used and implemented within any desired process control programming environment, and may be used in any process control system using any desired type of process control communication protocol and, further, may be used to perform any type of function with respect to any type of device(s) or sub-units of device(s). Process control routines using dynamic unit selection as described herein are preferably implemented in software stored in, for example, a controller or other process control device. However, these routines may alternatively or additionally be implemented in hardware, firmware, application specific integrated circuits, programmable logic circuits, etc., as desired. If implemented in software, the process control routines may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system for use in controlling a process having multiple unit classes, each of which includes one or more units, the process control system comprising:
   a controller;
   a memory;
   a control routine written to perform a unit procedure using an unspecified unit within one of the unit classes; and
   a dynamic unit selection routine that selects a particular unit as the unspecified unit during operation of the control routine;
   wherein the control routine performs the unit procedure using the particular unit selected by the dynamic unit selection routine.

2. The process control system of claim 1, wherein the dynamic unit selection routine determines a set of possible units and selects the particular unit from the set of possible units.

3. The process control system of claim 2, wherein the control routine is implemented on a process cell having an associated set of units and wherein the dynamic unit selection routine determines the set of possible units based on the associated set of units.

4. The process control system of claim 2, wherein the control routine is implemented on an equipment train having an associated set of units and wherein the dynamic unit selection routine determines the set of possible units based on the associated set of units.

5. The process control system of claim 1, wherein the dynamic unit selection routine determines if each of a set of units is suitable for use by the control routine based on a suitability criterion and selects the particular unit from the units that meet the suitability criterion.

6. The process control system of claim 1, wherein the dynamic unit selection routine prioritizes a set of units to produce a prioritized list of units and selects the particular unit from the prioritized list of units in order of priority.

7. The process control system of claim 1, further including a table that defines a selection criterion and wherein the dynamic unit selection routine uses the table to select the particular unit.

8. The process control system of claim 7, further including a set of tags that define parameters for each of the units in a set of units and wherein the dynamic unit selection routine uses the set of tags to determine if each of the units in the set of units meets the selection criterion.

9. The process control system of claim 7, wherein the selection criterion is a suitability expression.

10. The process control system of claim 7, wherein the selection criterion is a priority expression.

11. The process control system of claim 7, wherein the table is stored as an object in an object oriented programming environment.

12. The process control system of claim 1, wherein the control routine implements a series of unit procedures and wherein the dynamic unit selection routine selects the particular unit for a later unit procedure of the control routine as a unit used in an earlier unit procedure of the control routine.

13. The process control system of claim 1, wherein the dynamic unit selection routine determines a set of possible units, determines if each of the set of possible units is suitable for use by the control routine based on a suitability criterion, prioritizes the units that meet the suitability criterion to produce a prioritized list of units based on a priority criterion and selects the particular unit from the prioritized list of units in order of priority.

14. The process control system of claim 13, wherein the dynamic unit selection routine determines if one or more of the units on the prioritized list of units is capable of being acquired and selects the first unit on the prioritized list of units that is capable of being acquired as the particular unit.

15. A process control system for use in controlling a process having multiple unit classes, each of which includes one or more units, the process control system comprising:
   a controller;
   a memory;
   a control routine written to perform multiple unit procedures, each using an unspecified unit; and
   a dynamic unit selection routine that selects a particular unit as the unspecified unit for at least one of the multiple unit procedures during operation of the control routine.

16. The process control system of claim 15, wherein the dynamic unit selection routine determines, for the one of the multiple unit procedures, if each of a set of units is suitable for use by the control routine based on a suitability criterion associated with the unit procedure and selects the particular unit from the units that meet the suitability criterion.

17. The process control system of claim 15, wherein the dynamic unit selection routine prioritizes, for the one of the multiple unit procedures, a set of units to produce a prioritized list of units and selects the particular unit for the one of the multiple unit procedures from the prioritized list of units in order of priority.

18. The process control system of claim 15, further including a table that defines a selection criterion and wherein the dynamic unit selection routine uses the table to select the particular unit for the one of the multiple unit procedures.

19. The process control system of claim 18, further including a set of tags that define parameters for each of the units in a set of units and wherein the dynamic unit selection routine uses the set of tags to determine if each of the units in the set of unit meets the selection criterion.

20. The process control system of claim 15, wherein the dynamic unit selection routine selects the particular unit for a later unit procedure of the control routine as a unit used in an earlier unit procedure of the control routine.

21. The process control system of claim 15, wherein the dynamic unit selection routine determines, for the one of the multiple unit procedures, a set of possible units, determines if each of the set of possible units is suitable for use by the control routine based on a suitability criterion, prioritizes the units that meet the suitability criterion to produce a prioritized list of units based on a priority criterion and selects the particular unit from the prioritized list of units in order of priority.

22. A control component for use in a process control system having a processor that controls a process using one or more units in each of a multiplicity of unit classes, the control component comprising:
 a computer-readable memory;
 a control procedure written to perform a unit procedure of the process using an unspecified unit within one of the unit classes; and
 a dynamic unit selection procedure that selects a particular unit as the unspecified unit during operation of the control procedure;
 wherein said control procedure and said dynamic unit selection procedure are stored on the computer-readable memory and are adapted to be executed by the processor so that the control procedure performs the unit procedure of the process using the particular unit selected by the dynamic unit selection procedure after the dynamic unit selection procedure selects the particular unit.

23. The control component of claim 22, wherein the dynamic unit selection procedure determines a set of possible units and selects the particular unit from the set of possible units.

24. The control component of claim 22, wherein the dynamic unit selection procedure determines if each of a set of units is suitable for use by the control procedure based on a suitability criterion and selects the particular unit from the units that meet the suitability criterion.

25. The control component of claim 22, wherein the dynamic unit selection procedure prioritizes a set of units to produce a prioritized list of units and selects the particular unit from the prioritized list of units in order of priority.

26. The control component of claim 22, further including a table that defines a selection criterion and wherein the dynamic unit selection procedure uses the table to select the particular unit.

27. The control component of claim 26, further including a set of tags that define parameters for each of the units in a set of units and wherein the dynamic unit selection procedure uses the set of tags to determine if each of the units in the set of units meets the selection criterion.

28. The control component of claim 26, wherein the selection criterion is a suitability expression.

29. The control component of claim 26, wherein the selection criterion is a priority expression.

30. The control component of claim 22, wherein the control procedure implements a series of unit procedures and wherein the dynamic unit selection procedure selects the particular unit for a later unit procedure of the control procedure as a unit used in an earlier unit procedure of the control procedure.

31. The control component of claim 22, wherein the dynamic unit selection procedure determines a set of possible units, determines if each of the set of possible units is suitable for use by the control procedure based on a suitability criterion, prioritizes the units that meet the suitability criterion to produce a prioritized list of units based on a priority criterion and selects the particular unit from the prioritized list of units in order of priority.

32. The control component of claim 31, wherein the dynamic unit selection procedure determines if one or more of the units on the prioritized list of units is capable of being acquired and selects the first unit on the prioritized list of units that is capable of being acquired as the particular unit.

33. A method of controlling a process having a controller connected to control units within each of a plurality of unit classes, the method comprising the steps of:
 running a control procedure to perform a series of unit procedures associated with the process, wherein each unit procedure uses a unit associated with one of the unit classes; and
 automatically selecting, during the operation of the control procedure, a particular unit as the unit to be used during one of the unit procedures.

34. The method of claim 33, wherein the step of automatically selecting a particular unit includes the steps of determining a set of possible units as a set of units within a process cell or an equipment train of the process and selecting the particular unit from the set of possible units.

35. The method of claim 33, wherein the step of automatically selecting a particular unit includes the steps of determining if each of a set of units is suitable for use by the control procedure based on a suitability criterion and selecting the particular unit from the units that meet the suitability criterion.

36. The method of claim 33, wherein the step of automatically selecting a particular unit includes the steps of prioritizing a set of units to produce a prioritized list of units and selecting the particular units from the prioritized list of units in order of priority.

37. The method of claim 33, further including the steps of storing a selection criterion in a table and wherein the step of automatically selecting a particular unit includes the step of using the table to select the particular unit.

38. The method of claim 37, further including the step of storing a set of parameters for each of a set of units and wherein the step of automatically selecting the particular unit includes the step of using the parameters to determine if each of the units in the set of units meets the selection criterion.

39. The method of claim 33, wherein the step of automatically selecting the particular unit includes the steps of determining a set of possible units, determining if each of the set of possible units is suitable for use by the control procedure based on a suitability criterion, prioritizing the units that meet the suitability criterion to produce a prioritized list of units based on a priority criterion and selecting the particular unit from the prioritized list of units in order of priority.

* * * * *

UNITED STATES PATENT AND TRADEMARK OFFICE
CERTIFICATE OF CORRECTION

PATENT NO.    : 6,522,934 B1
DATED         : February 18, 2003
INVENTOR(S)   : William G. Irwin et al.

It is certified that error appears in the above-identified patent and that said Letters Patent is hereby corrected as shown below:

Column 1,
Line 57, delete "performs a number" and insert -- performs a number --.

Column 3,
Line 39, delete "Fisher-Rosemont" and insert -- Fisher-Rosemount --.

Column 6,
Line 20, delete "in turn in" and insert -- in turn is --.

Column 11,
Line 51, delete "set any in other" and insert -- set in any other --.

Column 13,
Line 66, delete "assumed be" and insert -- assumed to be --.

Column 17,
Line 14, delete "of unit" and insert -- of units --.

Signed and Sealed this

Twentieth Day of July, 2004

JON W. DUDAS
*Acting Director of the United States Patent and Trademark Office*